United States Patent
Chuang et al.

(10) Patent No.: US 10,318,037 B2
(45) Date of Patent: Jun. 11, 2019

(54) DETECTION METHOD FOR ENHANCED 3D DETECTION MODULE

(71) Applicant: TPK Touch Solutions (Xiamen) Inc., Xiamen (CN)

(72) Inventors: Chih-Cheng Chuang, Hsinchu (TW); Tai-Shih Cheng, Taipei (TW); Shuo-Wen Wang, Taipei (TW)

(73) Assignee: TPK Touch Solutions(Xiamen) Inc., Xiamen (CN)

( * ) Notice: Subject to any disclaimer, the term of this patent is extended or adjusted under 35 U.S.C. 154(b) by 0 days.

(21) Appl. No.: 15/206,306

(22) Filed: Jul. 10, 2016

(65) Prior Publication Data
US 2017/0010729 A1    Jan. 12, 2017

(30) Foreign Application Priority Data

Jul. 10, 2015 (CN) ............ 2015 1 0404570
Sep. 11, 2015 (CN) ............ 2015 1 0578012

(51) Int. Cl.
*G06F 3/041* (2006.01)

(52) U.S. Cl.
CPC .......... *G06F 3/0414* (2013.01); *G06F 3/0416* (2013.01); *G06F 2203/04101* (2013.01)

(58) Field of Classification Search
CPC ......... G06F 2203/04101; G06F 3/0414; G06F 3/0416
See application file for complete search history.

(56) References Cited

U.S. PATENT DOCUMENTS

| | | | | |
|---|---|---|---|---|
| 4,772,763 | A * | 9/1988 | Garwin ............... | G06F 3/0354 345/175 |
| 2008/0062140 | A1 * | 3/2008 | Hotelling ............. | G09G 3/3648 345/173 |
| 2016/0062497 | A1 * | 3/2016 | Huppi ................. | G06F 3/0414 345/177 |

* cited by examiner

*Primary Examiner* — Ram A Mistry
(74) *Attorney, Agent, or Firm* — Cooper Legal Group, LLC

(57) ABSTRACT

A detection method for enhanced 3D detection module includes a plurality of touch units configured to sense positions of touch points, a plurality of pressure-sensitive units configured to sense pressing forces and a signal processing circuit, the detection method including: providing a touch scanning pulse to the plurality of touch units and providing a pressure scanning pulse to at least two of the pressure-sensitive units; generating touch signals by the plurality of touch units in response to the touch scanning pulse sensing the positions of the touch points and generating a superimposed pressure signal by the at least two of the pressure-sensitive units in response to the pressure scanning pulse sensing the pressing forces; and determining a position and a pressing force value of at least one touch point by the signal processing circuit according to the superimposed pressure signal and the touch signals.

20 Claims, 11 Drawing Sheets

DETECTION METHOD FOR ENHANCED 3D DETECTION MODULE

RELATED APPLICATIONS

This application claims priority to China Application Serial Number 201510404570.1, filed Jul. 10, 2015, and 201510578012.7, filed Sep. 11, 2015, which are herein incorporated by reference.

BACKGROUND

Technical Field

The present disclosure relates to a detection method. More particularly, the present invention relates to a detection method for an enhanced 3D detection module with touch points detection and pressure detection.

Description of Related Art

With the development of touch technology, either present industry electronic devices or consumer electronic devices use display panels with touch feature. When the surface of the display panel with touch feature is under operation of fingers and touch pen, electronic device executes specific operations via detecting the positions of touch points. For the detection of touch points, either capacitive screen or resistive screen determines the two-dimensional coordinates of the touch points on the display panel via different principles. With the establishment of the two-dimensional coordinate system (X, Y) on the surface of display panel, the detection of touch points is equivalent to determining the positions in X-axis and Y-axis, that is, to determine the two-dimensional positions of the touch points.

To further enrich the display panels with touch feature, there are some display panels equipped with pressure transducers. Said pressure transducers include a plurality of pressure-sensitive units. When sensing pressing forces that are perpendicular to or in Z-axis direction of the display panels, the pressure-sensitive units will deform and cause the electric signal at the positions of the pressure-sensitive units to change. To detect the electric signal can determine the pressure that the pressure-sensitive units are under. A device can have functions corresponding to different pressing forces at different touch points. That is, we can enrich design via 3D (three-dimension) angle defined by touch points (X, Y) and pressure (Z).

However, a common problem existing in present display panels with 3D detection feature is that the detection of pressure signal is not precise enough and results in poor user experience. In addition, signal interference is prone to happen between the detection of pressure and the detection of touch points.

SUMMARY

To solve the problem of not enough precise detection of pressure signal in present display panel with 3D detection function, the present disclosure provides a detection method for enhanced 3D detection module.

The present disclosure provides a method for solving the above-mentioned problem: a detection method for enhanced 3D detection module. The enhanced 3D detection module includes a plurality of touch units configured to sense positions of sensitive touch points, a plurality of pressure-sensitive units configured to sense pressing forces and a signal processing circuit. The detection method comprising: step 1: providing a touch scanning pulse to the plurality of touch units; providing a pressure scanning pulse to at least two of the pressure-sensitive units; step 2: generating touch signals by the plurality of touch units in response to the touch scanning pulse sensing the positions of the sensitive touch points; providing a superimposed pressure signal by the at least two of the pressure-sensitive units in response to the pressure scanning pulse sensing the pressing forces; and step 3: determining a position and a pressing force value of at least one touch point by the signal processing circuit according to the superimposed pressure signal and the touch signals.

Preferably, in the step 2, the at least two of the pressure-sensitive units are disposed on a same plane, and the at least two of the pressure-sensitive units are independent and adjacent to each other.

Preferably, in the step 2, the at least two of the pressure-sensitive units are disposed on a same plane, and the at least two of the pressure-sensitive units are connected in series.

Preferably, in the step 2, the at least two of the pressure-sensitive units are disposed on a first pressure-sensitive layer and a second pressure-sensitive layer, respectively, and are disposed oppositely to each other, in translational displacement, in a staggered manner, or in a complementary manner in vertical projection direction.

Preferably, in the step 2, the pressure scanning pulse of the at least two of the pressure-sensitive units and the touch scanning pulse are generated at different time periods. The at least two of the pressure-sensitive units receive the same pressure scanning pulse, or receive two independent pressure scanning pulses generated at the same time period or generated at different time periods.

Preferably, in the step 2, the pressure scanning pulse of the at least two of the pressure-sensitive units and the touch scanning pulse are generated at the same time period, and potential switching points of the pressure scanning pulse and the touch scanning pulse are staggered.

Preferably, in the step 2, the at least two of the pressure-sensitive units are respectively selected from vertically or horizontally adjacent two groups of pressure-sensitive units. Each of the groups of pressure-sensitive units includes at least one pressure-sensitive unit, the pressure scanning pulse of the at least two of the pressure-sensitive units and the touch scanning pulse are generated at different time periods, and potential switching points of the pressure scanning pulse and the touch scanning pulse are staggered.

Preferably, in the step 2, the at least two of the pressure-sensitive units are a plurality of pressure-sensitive units. The pressure-sensitive units are respectively disposed on a first pressure-sensitive layer and a second pressure-sensitive layer. The plurality of pressure-sensitive units disposed on the first pressure-sensitive layer and the second pressure-sensitive layer respectively are divided into groups and the pressure-sensitive units of each group are connected in series. Each of the groups of pressure-sensitive units includes at least two pressure-sensitive units.

Preferably, in the step 2, at least one pressure-sensitive unit of the at least two of the pressure-sensitive units is disposed on the first pressure-sensitive layer, and at least one pressure-sensitive unit is disposed on the second pressure-sensitive layer. The pressure scanning pulse of the at least one pressure-sensitive unit in the first pressure-sensitive layer and the pressure scanning pulse of the at least one pressure-sensitive unit on the second pressure-sensitive layer are generated at the same time period.

Preferably, the enhanced 3D detection module includes a display module. The display module includes a plurality of pixel units driven by a pixel scanning pulse. The pixel scanning pulse and the pressure scanning pulse are generated at the same time period, and the pixel scanning pulse and the touch scanning pulse are generated at the same time period.

Preferably, the enhanced 3D detection module includes a driver. The driver provides the pixel scanning pulse, the pressure scanning pulse and the touch scanning pulse directly or indirectly.

Preferably, the frequency of the pixel scanning pulse is Fg, the frequency of the touch scanning pulse is Ft, and the frequency of the pressure scanning pulse is Ff, wherein Fg>Ft>Ff, Fg=(1~20)Ft, Fg=(1~50)Ff.

Compared with prior art, the touch display device provides by present disclosure has the following advantages.

1. Enhancing the effect of pressure detection by detecting a plurality of pressure-sensitive units (pressure-sensitive unit set) at the same time. The enhanced 3D detection module selects the pressure-sensitive units corresponding to the positions of pressing randomly or in accordance with procedures to execute superimposed detection, which improves the pressure detection sensitivity and detection accuracy of the enhanced 3D detection module.

2. The plurality of pressure-sensitive units detected at the same time use the same driver to provide pressure scanning pulse at the same time. This kind of driving manner ensures the synchronization of pressing force value detection of different pressure-sensitive units to ensure the accuracy of pressing force value detection.

3. Electric signals at the potential switching points are vulnerable to signal interference and results in inaccuracy of the detection of positions of touch points or pressing force value. The touch scanning pulse and the pressure scanning pulse of the present disclosure are generated at different time periods, so that there is no signal interference between them. Moreover, although the touch scanning pulse and the pixel scanning pulse are generated at the same time period, the potential switching points of both are in the same duty cycle. Accordingly, the signal interference between the touch scanning pulse and the pixel scanning pulse is minimized significantly, which ensures the stability of 3D detection module. Similarly, the signal interference between the pixel scanning pulse and the pressure scanning pulse is also minimized significantly.

4. The present disclosure uses a Wheatstone bridge, which has simple structure and high control accuracy, to detect the pressing force value. Most importantly, the pressure signal processor uses the combination of a bridge and a multiplexer and selects different pressure-sensitive units via the multiplexer. Resistors Ra and Rb of the Wheatstone bridge constituted by the different pressure-sensitive units when detecting pressure signal are shared resistor. This design significantly minimizes the number of resistors of the Wheatstone bridge. Because of part of the shared hardware, error rate between each other is narrowed down when the different pressure-sensitive units is detecting pressure. Furthermore, the corresponding internal resistors RF0, RF1, RF2, . . . and RFn of the pressure-sensitive units are respectively provided with RC0, RC1, RC2, . . . and RCn as reference resistors. The reference resistors are disposed around RF0, RF1, RF2, . . . and RFn, so that the temperatures affecting them are identical and the noise affecting them are also similar. In this way, the stability of the Wheatstone bridge is improved and false signals caused by temperature drift of the hardware itself and environment factor are reduced. RF0, RF1, RF2, . . . and RFn and RC0, RC1, RC2, . . . and RCn are reference resistors to each other, so that the allocation of resources is improved while the noise is reduced. The signal output terminal of the Wheatstone bridge is connected to an operation amplifying circuit, which not only amplify an output signal U0 but also reduce the noise with the operation amplifying circuit characteristic of noise suppression. To take RF0 and RC0 as example, the change of resistance value of RF0 is Δr. In reality, RF0 is affected by temperature and other interferences to produce Δs (noise resistance change signal) which includes part noise from temperature change and part interference noise between electric signals. For the reference resistor RC0, the temperature and other interferences by which RC0 is affected are in consistent with those of RF0, so the reference resistor RC0 also has Δs noise. After the noise Δs is inverted via the inverting input terminal of the operational amplify circuit, Δs and the noise of varistor RF0 at non-inverting input terminal offset each other. After passing the operational amplify circuit, Δr is amplified twice and the noise caused by temperature and other interferences is eliminated, which improves the detection accuracy of pressure signal.

DETAILED DESCRIPTION

To clearly illustrate the purpose, the technical solution and the advantages of present disclosure, a further detailed description will be rendered with figures and embodiments. It should be appreciated that the described embodiments herein are only for explanation of the present invention, and are not to limit the present invention. It should be noted that all the signal pulses mentioned in the embodiments use normal square pulse signals for explanation. However, in reality, the pulses can be any kind of signal that satisfies the signal processing principle of the present invention and are not limited to square pulse. In addition, there is no limit to signal procedure for square pulses.

Figure 1:
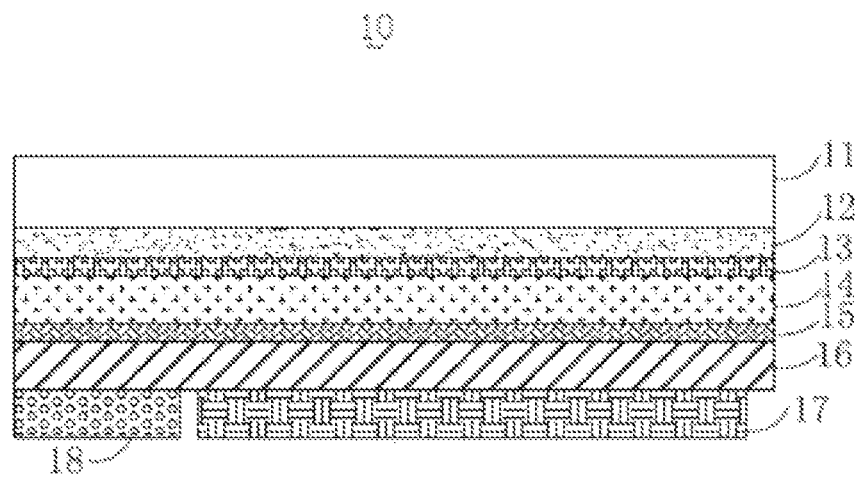
FIG. 1 is a layer structure schematic diagram of an enhanced 3D detection module according to a first embodiment of this disclosure.

See FIG. 1. The first embodiment of an enhanced 3D detection module 10 of the present disclosure includes (from top to bottom of FIG. 1) a top substrate 11, an adhesive layer 12, a pressure-sensitive layer 13, a first substrate layer 14, a touch sensitive layer 15, a second substrate layer 16, a display module 17 and a signal processing circuit 18. It should be noted that the wording "top," "bottom," "left" or "right" mentioned in the present disclosure indicates the relative position rather than the absolute position. The pressure-sensitive layer 13, the touch sensitive layer 15 and the display module 17 are electrically connected to the signal processing circuit 18 via a conductive line (not shown in the figure).

The top substrate 11 can be regard as a touch cover plate of the traditional touch panel. The touch cover plate includes a touch operation interface and a component installation interface, wherein the touch operation interface is operated by using fingers or touch pen, and the component installation interface is used for installing touch components, pressure-sensitive components or display module.

The adhesive layer 12 can be OCA (Optical Clear Adhesive) or LOCA (Liquid Optical Clear Adhesive) to bond the top substrate 11 and other components.

The first substrate layer 14 and second substrate layer 16 are the supporting layers of the pressure-sensitive layer 13 and the touch sensitive layer 15 respectively. The material of the first substrate layer 14 and the second substrate layer 16 can be flexible or rigid substrate. For the first substrate layer 14, flexible substrate is preferable.

The signal processing circuit 18 is disposed under the second substrate layer 16, but the position is not limited. The signal processing circuit 18 can also be disposed on the top of the second substrate layer 16 or at the side of the second substrate layer 16.

There are a plurality of touch units (not shown in the figure) disposed on the touch sensitive layer 15 in array, wherein each touch unit has a touch driving line, the touch driving line is used for receiving driving signal (i.e., touch scanning pulse). When the touch scanning pulse is delivered to the touch units, the touch units generate a touch signal to the signal processor in response to an electrical change resulted from the operation of fingers or touch pen, and the signal processor processes the touch signal to obtain the position of the touch point.

There are a plurality of pixel units (not shown in the figure) disposed on the display module 17 in array, wherein each pixel unit has a pixel driving line, the pixel driving line is used for receiving driving signal: pixel scanning pulse. When the pixel scanning pulse is delivered to the pixel units, the pixel units operate.

Figure 2:
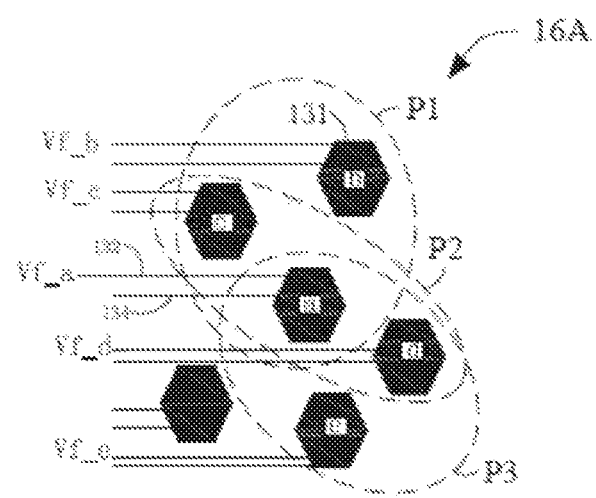
FIG. 2 is a partial structure schematic diagram of a pressure-sensitive layer of the enhanced 3D detection module according to the first embodiment of this disclosure.

With reference to FIG. 2, there are a plurality of independent pressure-sensitive unit 131 disposed on the pressure-sensitive layer 13. In this embodiment, the pressure-sensitive unit 131 is regular hexagon (it should be noted that the pressure-sensitive unit 131 can also be square, triangular, diamond-shaped or other irregular shapes, for example, cross and saltire shape, like the symbol "※", preferably). Each pressure-sensitive unit 131 includes at least one pressure driving line 132 and at least one pressure signal reception line 134, wherein the pressure driving line 132 is used for receiving driving signal (i.e., pressure scanning pulse). When the pressure scanning pulse is delivered to the pressure-sensitive unit 131, the pressure-sensitive unit generates a pressure signal in response to an electrical signal change resulted from the material characteristic of the pressure-sensitive unit 131 deforms under stress (that is, tension force causes resistance change of material with specific pattern) due to the operation of fingers or touch pen. The pressure signal is sent to the signal processing circuit 18 via the pressure signal reception line 134. The signal processing circuit 18 processes the pressure signal to obtain the pressing value.

Figure 3:
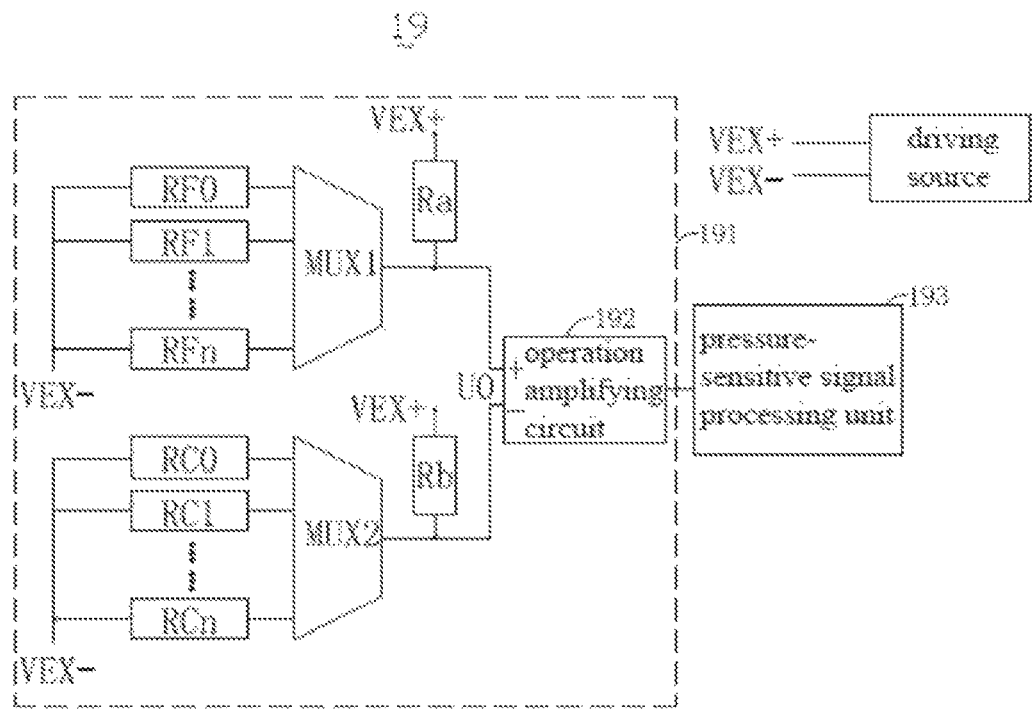
FIG. 3 is a circuit structure schematic diagram of a pressure signal processor of the enhanced 3D detection module according to the first embodiment of this disclosure.

See FIG. 3. The signal processor 18 includes a pressure signal processor 19, at least one driver (not shown in the figure), at least one electric bridge 191 and a pressure-sensitive signal processing unit 193. The at least one electric bridge 191 is electrically connected to a pressure-sensitive signal processing unit 193. The at least one driver respectively provides the pressure scanning pulse, touch scanning pulse and the pixel scanning pulse to the pressure-sensitive unit 131, the touch unit and the pixel unit. Preferably, the pressure scanning pulse, the touch scanning pulse and the pixel scanning pulse are provided directly or indirectly by a same driver, wherein the indirect provision can be a driving signal from a driver undergoing selection, displacement, pulse bandwidth narrowing, and/or frequency division of a driving signal by a driving pulse processing circuit and then be provided to the touch unit and/or the pressure-sensitive unit 131.

The electric bridge 191 includes a first multiplexer MUX1, a second multiplexer MUX2, at least one resistor Ra, at least one resistor Rb (disposed on a control chipset) and an operation amplifying circuit 192. The outputs of the first multiplexer MUX1 and the second multiplexer MUX2 provide input signal U0 to the operation amplifying circuit 192, and are electrically connected to the non-inverting input terminal and the inverting input terminal of the operation amplifying circuit 192 respectively. The output terminal of the operation amplifying circuit 192 is connected to a pressure-sensitive signal processing unit 193 for processing pressure signal.

The output terminal of the first multiplexer MUX1 is connected to one terminal of the resistor Ra. Another terminal of the resistor Ra is electrically connected to a positive terminal VEX+ of a driving source. The output terminal of the second multiplexer MUX2 is connected to one terminal of the resistor Rb. Another terminal of the resistor Rb is electrically connected to a negative terminal VEX− of the driving source. In related embodiment, the driving source uses single power source or double power sources but is not limited thereto. Driving signal can use square wave, sine wave, constant voltage signal or other appropriate given signal. That is, the form of signal is not limited. Preferably, the driving source uses the pressure scanning pulse with square wave scanning pulse disclosed in every embodiment of the present disclosure as the signal provided by the driving source to drive the pressure-sensitive unit 131 and to detect changes.

The input terminal of the first multiplexer MUX1 is connected to a pressure signal reception line 134 of a first set of plurality of pressure-sensitive units 131. That is, the pressure-sensitive unit 131 is connected to the input terminal of the first multiplexer MUX1. The corresponding internal resistors of the first set of plurality of the pressure-sensitive units 131 are RF0, RF1, RF2, . . . RFn. When a user touches the top substrate 11 and generates a certain pressure, the resistance of the corresponding internal resistors RF1, RF2 . . . RFn of the pressure-sensitive unit 131 that is under the top substrate 11 change. The first multiplexer MUX1 can choose one of the RF0, RF1, RF2 . . . RFn as the input.

The input terminal of the second multiplexer MUX2 is connected to the pressure signal reception line 134 of a second set of plurality of pressure-sensitive units 131 of a pressure transducer 16A (or also named as pressure sensor, force sensor). The internal resistors of the second set of plurality of pressure-sensitive units 131 are RC0, RC1, RC2 . . . RCn, which are matching with the RF0, RF1, RF2 . . . RFn respectively. For example, the RC0 is located near the RF0, the RC1 is located near the RF, and so on. The RC0, RC1, RC2, . . . RCn and the RF0, RF1, RF2, . . . RFn are reference resistors to each other and one terminal of each resistor is connected to the negative terminal VEX− of the driving source. The second multiplexer MUX2 can choose one of the RC0, RC1, RC2, . . . RCn as the input.

Figure 4:
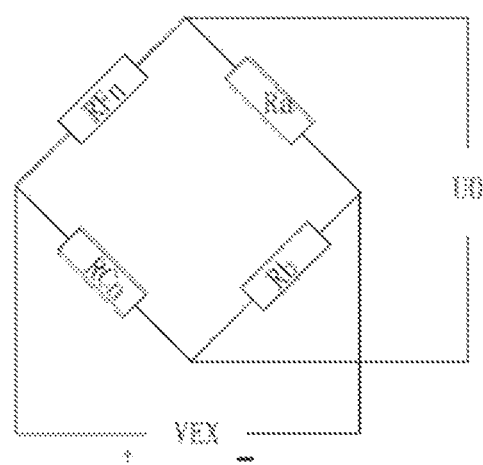
FIG. 4 is a schematic diagram of a pressure signal detection principle in FIG. 3.

See FIG. 4. Taking the first multiplexer MUX1 choosing the RF0 and the second multiplexer MUX2 choosing the RC0 as an example to illustrate the working principle of the pressure transducer 16A. The resistor RF0, the resistor RC0 (located on the pressure-sensitive layer 13) and the resistor Ra/Rb (which can be disposed on the control chipset) constitute a Wheatstone bridge. When there is no pressing force, the Wheatstone bridge is in an equilibrium state. The driving source provides regulated power to the electric bridge 191, wherein the polarity of the regulated power is not considered when be plugged in. In this embodiment, DC regulated power supply is preferable. When a user operates via the top substrate 11 and generates a pressing force to the top substrate 11, the resistance(s) of one or more of the corresponding internal resistors RF0, RF1, RF2, . . . RFn of the pressure-sensitive units 131 change, so that the equilibrium state of the Wheatstone bridge is broken, resulting the output electrical signal U0 changes. Different resistance change corresponds to different pressure value. Accordingly, the corresponding pressure value can be obtained by computing and processing the output signal U0 of the Wheatstone bridge. In real use, we can use common fixed reference resistor to replace RC0, RC1, RC2, . . . RCn according to needs.

For enhancing detection accuracy of pressing value, the present embodiment selects at least two pressure-sensitive units 131 at the same time to detect pressing value. Taking the plurality of the pressure-sensitive units 131 depicted in FIG. 2 as an example to illustrate:

In FIG. 2, there are a pressure-sensitive unit 'a', a pressure-sensitive unit 'b', a pressure-sensitive unit 'c', a pressure-sensitive unit 'd' and a pressure-sensitive unit 'e'. The pressure-sensitive unit 'a', the pressure-sensitive unit 'b', the pressure-sensitive unit 'c', the pressure-sensitive unit 'd' and the pressure-sensitive unit 'e' have pressure driving lines Vf_a, Vf_b, Vf_c, Vf_d and Vf_e respectively. When fingers or pen is operating on the top substrate 11 and generates a pressing value to the top substrate 11, setting the center position of the touch points to correspond to the position of the pressure-sensitive unit 'a' on the pressure-sensitive layer 13. However, in reality, the distribution density of touch unit is usually higher than the distribution density of the pressure-sensitive units 131. When a user is operating, the point of pressing corresponds to a plurality of pressure-sensitive units 131, especially when the size of the pressure-sensitive units 131 is small. That is, the position of pressing corresponds to not only the position of the pressure-sensitive unit 'a', but also one or more of the adjacent pressure-sensitive unit 'b', pressure-sensitive unit 'c', pressure-sensitive unit 'd' and pressure-sensitive unit 'e'. Accordingly, while the internal resistance of the pressure-sensitive unit 'a' changes, the internal resistance(s) of one or more of the pressure-sensitive unit 'b', the pressure-sensitive unit 'c', the pressure-sensitive unit 'd' and the pressure-sensitive unit 'e' are also likely to change because of falling within the area of pressing. In this case, we can select the pressure-sensitive unit 'a' and one or more of the near pressure-sensitive units 131 to process pressure detection in order to reinforce the pressure signal.

Choosing three pressure-sensitive units 131 at the same time for example (according to an algorithm selection logic). The center position of the touch point corresponds to the position of the pressure-sensitive unit 'a' on the pressure-sensitive layer 13. For detecting the pressing value, signal processing circuit 18 selects, randomly or in accordance with a procedure, two pressure-sensitive units 131 that are near the pressure-sensitive unit 'a' to detect the pressing value repeatedly (or for multiple time). Below is the specific detection: step P1: first selection of the pressure-sensitive unit 'a', the pressure-sensitive unit 'b' and the pressure-sensitive unit 'c' to detect the pressing value; step P2: second selection of the pressure-sensitive unit 'a', the pressure-sensitive unit 'c', the pressure-sensitive unit 'd' to detect the pressing value; step P3: third selection of the pressure-sensitive unit 'a', the pressure-sensitive unit 'd' and the pressure-sensitive unit 'e' to detect the pressing value.

Taking the first selection of the pressure-sensitive unit 'a', the pressure-sensitive unit 'b' and the pressure-sensitive unit 'c' in step P1 as an example to illustrate the principle of pressure signal reinforcement. See FIG. 5 (in present disclosure, there are only several specific time sequential charts for showing trends of electrical signal changes. However, real amount of the time sequential charts is in consistent with the amounts of the pixel units, the pressure-sensitive units 131 and the touch units). Driver provides pressure scanning pulse to the pressure-sensitive unit 'a', the pressure-sensitive unit 'b' and the pressure-sensitive unit 'c' at the same time (e.g., provides group driving signal). When under pressing force, the internal resistance(s) of one or more of the pressure-sensitive unit 'a', the pressure-sensitive unit 'b' and the pressure-sensitive unit 'c' changes because of the pressing force. The pressure-sensitive unit 'a', the pressure-sensitive unit 'b' and the pressure-sensitive unit 'c' send the pressure signal to different electric bridges 191 via the pressure signal reception line 134 respectively. After the different electric bridges 191 receive the pressure signal, the Wheatstone bridge detects corresponding internal resistance variances (in parallel or in series), and then superimposes the corresponding internal resistance variances of the pressure-sensitive unit 'a', the pressure-sensitive unit 'b' and the pressure-sensitive unit 'c' to output to the pressure-sensitive signal processing unit 193, and the detection of the pressing value is completed. Because of selecting a plurality of pressure-sensitive units 131 at the same time in detection, the superimposition of the corresponding internal resistances variances of the plurality of pressure-sensitive units 131 is definitely higher than the corresponding internal resistance variance of single pressure-sensitive unit 131, which is equivalent to enhance the pressure signal and leads to an improvement of the sensitivity of pressure detection of the enhanced 3D detection module 10.

Figure 5:
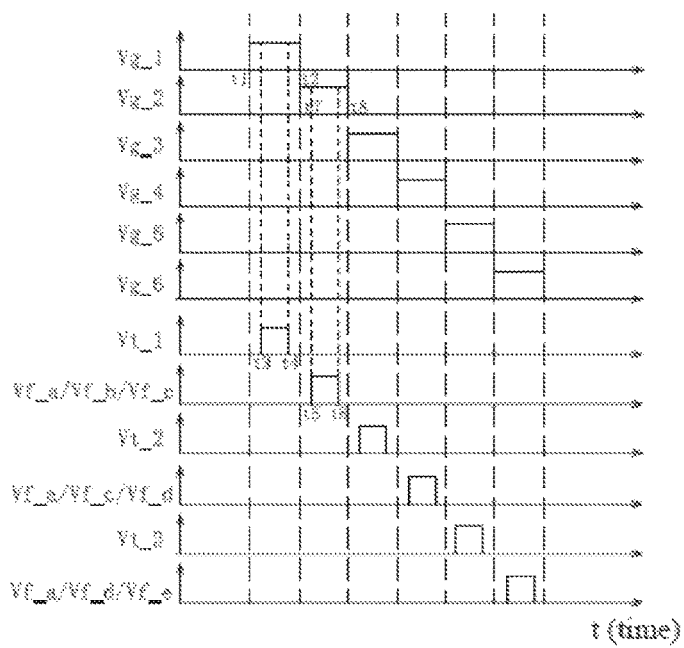
FIG. 5 is a time sequential chart of a pixel scanning pulse, touch scanning pulse and pressure scanning pulse of the enhanced 3D detection module according to the first embodiment of this disclosure.

The driver provides a pressure pulse signal to the selected plurality of the pressure-sensitive units 131 at the same time (e.g., provides group driving signal). The pulse width of the pressure scanning pulse is narrower than (or not wider than) the pulse width of the pixel scanning pulse received by the pixel unit, and the potential switching points of them are staggered. The pulse width of the touch scanning pulse is also narrower than (or not wider than) the pulse width of the pixel scanning pulse and the potential switching points of them are staggered. The touch scanning pulse and the pixel scanning pulse are generated at the same time period (or time sequence), and the time period of the touch scanning pulse and the pixel scanning pulse is different from the time period of the pressure scanning pulse. The pressure scanning pulse and the pixel scanning pulse generate at the same time period (or time sequence). As shown in FIG. 5, Vg_n (n is integer, selecting 1-6 of FIG. 5 for example) represents the pixel scanning pulses received by different pixel units. Vt_n (n is integer, selecting 1-3 of FIG. 5 for example) represents the touch scanning pulses received by different touch units. Vf_F (F is the number of the pressure-sensitive units) represents the pressure scanning pulses received by different pressure-sensitive units. The pulse widths of Vf_F and Vt_n are preferably narrower than the pulse width of Vg_n. Specifically, Vf_a, Vf_b and Vf_c represent the pressure scanning pulses received by the pressure-sensitive unit 'a', the pressure-sensitive unit 'b' and the pressure-sensitive unit 'c' respectively. In this embodiment, Vf_a, Vf_b and Vf_c are simultaneous and have same pulse width and same amplitude intensity. Vg_1 and Vg_2 respectively represent pixel scanning pulse time sequential charts received by pixel unit 1 and pixel unit 2. Vt_1 is the touch scanning pulse received by the touch unit 1. The potential switching points of Vg_1 are t1 and t2. The potential switching points of Vg_2 are t7 and t8. The potential switching points of Vt_1 are t3 and t4. The potential switching points of Vf_a+b+c are t5 and t6, wherein t1<t3<t4<t2<t5<t6<t8 and t2=t7. When the pixel unit 1 operates, the touch units and the pressure-sensitive units 131 are not yet in operation. When the operation of the touch unit 1 starts and ends (potential switching points), the pixel scanning pulse received by the pixel unit 1 is in a steady state, so the potential switching points of the touch unit 1 don't cause signal interferences. Similarly, the pressure scanning pulses received by the pressure-sensitive unit 'a', the pressure-sensitive unit 'b' and the pressure-sensitive unit 'c' don't cause signal interferences to pixel unit 2. The touch scanning pulse and the pressure scanning pulse are generated at different time periods, so there is no interference signal between them.

In one detection process of pressing value, the amount of selection of the pressure-sensitive units 131 is not limited, and can be chosen according to the specific sizes and the amount of the pressure-sensitive units 131.

In all the embodiments of present disclosure, the same time period means that in one duty cycle (the potential is "1") of the pixel scanning pulse, the duty cycle of the pressure scanning pulse/touch scanning pulse has overlap with the duty cycle of the pixel scanning pulse. Otherwise, they are generated at different time periods. Compared with prior art, the enhanced 3D detection module of present disclosure has the following advantages:

1. Enhancing the effect of pressure detection via detecting a plurality of pressure-sensitive unit 131 (pressure-sensitive unit set) at the time, and the enhanced 3D detection module selects, randomly or in regular procedure, the pressure-sensitive units 131 corresponding to the positions of pressing to operate superimposed detection, which improve the sensitivity of pressure detection and detecting accuracy of the enhanced 3D detection module 10.

2. Using the same driver to provide the pressure scanning pulses to the plurality of pressure-sensitive units 131 detected at the same time. This simultaneous driving method ensures synchronization of pressing value detection of different pressure-sensitive units 131, and accordingly, guarantees the accuracy of pressing value detection.

3. Electric signal between potential switching points is vulnerable to signal interference, so the detection of the positions of touch points or pressing values is not accurate. In present disclosure, the touch scanning pulse and the pressure scanning pulse are generated at different time periods, so there is no signal interference between them. Although the touch scanning pulse and the pixel scanning pulse are generated at the same time period, the potential switching points of both in a same cycle are staggered and accordingly, the signal interference between them is significantly minimized, which makes sure the stability of the 3D detection module. Similarly, the signal interference between the pixel scanning pulse and the pressure scanning pulse is significantly minimized, too.

4. Using Wheatstone bridge to detect pressing value has the merits of simple circuit structure and high control accuracy. Most importantly, the pressure signal processor 19 uses the electric bridge 191 combined with a multiplexer, and selects different pressure-sensitive units 131 via the multiplexer. In the Wheatstone bridge constituted when different pressure-sensitive units 131 are detecting pressure signal, resistors Ra and Rb are common resistor, which significantly minimizes the amount of resistors of the Wheatstone bridge, and when different pressure-sensitive units 131 are detecting pressure, because of parts of the hardware are common, the error rates of each other are reduced. Further, the internal resistors RF0, RF1, RF2, . . .

RFn which are corresponding to the pressure-sensitive units 131 respectively have corresponding RC0, RC1, RC2, . . . RCn as the reference resistors. The reference resistors are disposed near RF0, RF1, RF2, . . . RFn, so the temperatures effecting them are consistent and other noises influencing them are also similar, which is beneficial to the stability of the Wheatstone bridge and minimize false signals resulted from temperature drift of the hardware circuit itself and environment factors. RF0, RF1, RF2, . . . RFn and RC0, RC1, RC2, . . . RCn are reference resistors to each other, which minimizes the noise and improves the allocation of resources. The output signal terminal of the Wheatstone bridge is connected the operation amplifying circuit 192. The operation amplifying circuit 192 can not only amplify the output signal U0, but reduce the noise with the noise suppressing characteristic of the operation amplifying circuit 192. Taking RF0 and RC0 as an example, when the top substrate 11 is under pressing, resistance change of RF0 is $\Delta r$. However, in reality, RF0 is influenced by temperature and other interference and has noise $\Delta s$ ($\Delta s$ is the variance signal of noise resistor, which includes part noise from temperature change and part interference noise between electric signals). For the reference resistor RC0, the temperature and other interferences by which RC0 is affected are in consistent with those of RF0, so the reference resistor RC0 also has $\Delta s$ noise. After the noise $\Delta s$ is inverted via the inverting input terminal of the operation amplifying circuit 192. $\Delta s$ and the noise of varistor RF0 at non-inverting input terminal offset each other. After passing the operation amplifying circuit 192, $\Delta r$ is amplified twice and the noise $\Delta s$ caused by temperature and other interferences is eliminated, which improves the detection accuracy of pressure signal. In real use, any method for offsetting the noise of operational amplifier circuit can be used, for example, $U=A((V+)-(V-))=A((V\Delta r+V\Delta s)-(-V\Delta r+V\Delta s))=2A\ V\Delta r$, $\Delta s$ is the external triggering noise effect that doesn't be influenced by the inverting voltage. Any circuits with differential amplifier or amplifier combination or those which can offset the noise triggered externally are all within the scope of present invention.

Figure 6:
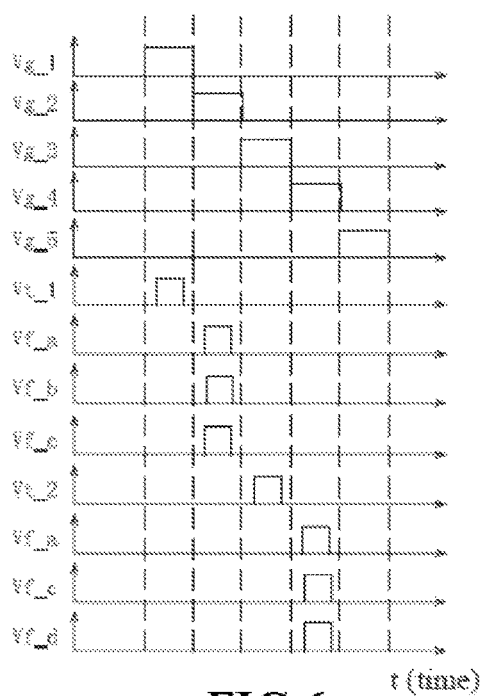
FIG. 6 is a time sequential chart of a pixel scanning pulse, touch scanning pulse and pressure scanning pulse of an enhanced 3D detection module according to a second embodiment of this disclosure.

See FIG. 6. The difference between a second embodiment of an enhanced 3D detection module (unnumbered) and the first embodiment is that the pressure-sensitive unit 'a', the pressure-sensitive unit 'b' and the pressure-sensitive unit 'c' don't use the same driving/pressure driving pulse to drive simultaneously. In this embodiment, the pressure-sensitive unit 'a', the pressure-sensitive unit 'b' and the pressure-sensitive unit 'c' receive different pressure scanning pulse, but the pressure scanning pulse Vf_a, Vf_b and Vf_c are generated at the same time period and the duty cycles of each are fully overlapped. The superimposition of the pressure signals of pressure-sensitive unit 'a', the pressure-sensitive unit 'b' and the pressure-sensitive unit 'c' can also enhance the detection effect.

Figure 7:
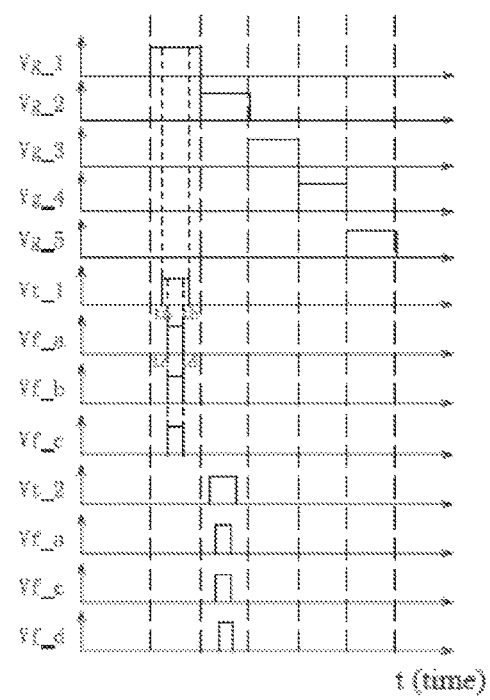
FIG. 7 is a time sequential chart of a pixel scanning pulse, touch scanning pulse and pressure scanning pulse of an enhanced 3D detection module according to a third embodiment of this disclosure.

See FIG. 7. The difference between a third embodiment of an enhanced 3D detection module (unnumbered) and the second embodiment is that the pressure scanning pulse received by the pressure-sensitive unit 'a', the pressure-sensitive unit 'b' and the pressure-sensitive unit 'c' is generated at the same time period with the touch scanning pulse. The pressure scanning pulse Vf_a, Vf_b and Vf_c are generated at the same time period and the duty cycles of them are fully overlapped. The pulse widths of Vf_a. Vf_b and Vf_c are narrower than the pulse width of the touch scanning pulse. The potential switching points of Vt_1 are ta and tb. The potential switching points of Vf_a, Vf_b and Vf_c are tc and td, wherein ta<tc<td<tb. The potential switching points of the pixel scanning pulse, the touch scanning pulse and the pressure scanning pulse are staggered in order to avoid mutual signal interference. The pressure scanning pulse and the touch scanning pulse are generated at the same time period, which minimizes the driving period and improves the operation efficiency of the enhanced 3D detection module. In this embodiment, the pressure scanning pulse Vf_a, Vf_b and Vf_c can be replaced by a same pressure scanning pulse (driving simultaneously) as a modification of the embodiment.

Figure 8:
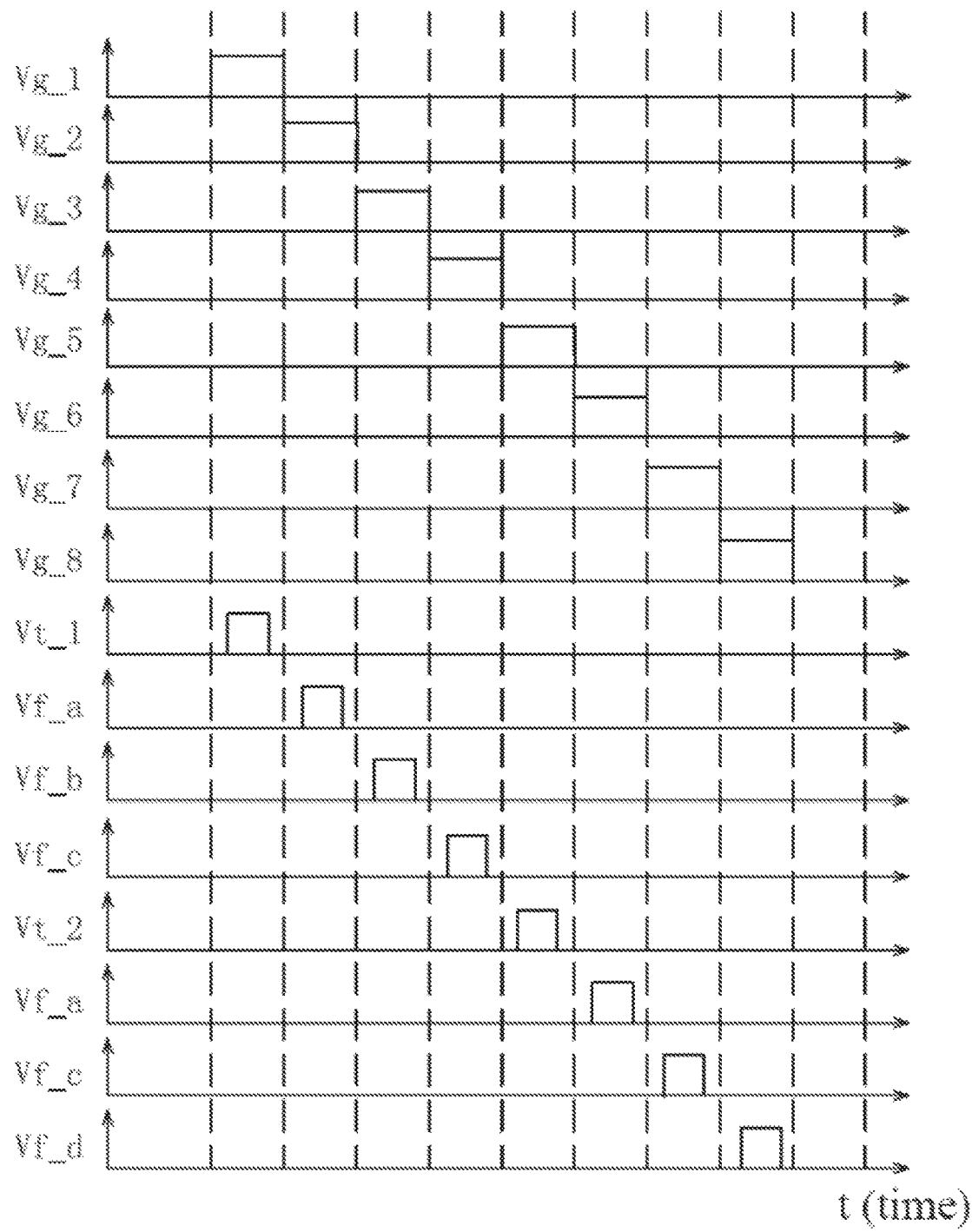
FIG. 8 is a time sequential chart of a pixel scanning pulse, touch scanning pulse and pressure scanning pulse of an enhanced 3D detection module according to a forth embodiment of this disclosure.

See FIG. 8. The difference between a fourth embodiment of an enhanced 3D detection module (unnumbered) and the third embodiment is that the touch scanning pulse of a touch electrode and the pressure scanning pulse of the pressure-sensitive unit are generated at different time period, and the pressure scanning pulses of selected plurality of pressure-sensitive units are also generated at different time periods in pressing value detection. More specifically, the pressure scanning pulse Vf_a, Vf_b and Vf_e of the pressure-sensitive unit 'a', the pressure-sensitive unit 'b' and the pressure-sensitive unit 'c' are generated at different time periods. Accordingly, there is no signal interference between the pressure-sensitive unit 'a', the pressure-sensitive unit 'b' and the pressure-sensitive unit 'c', and the detection accuracy is improved. Due to the relative independence of the detection of the pressing values between the plurality of sensing units, present pressing value can be obtained via superimposing the detection results, which also enhances the detection effect.

Figure 9:
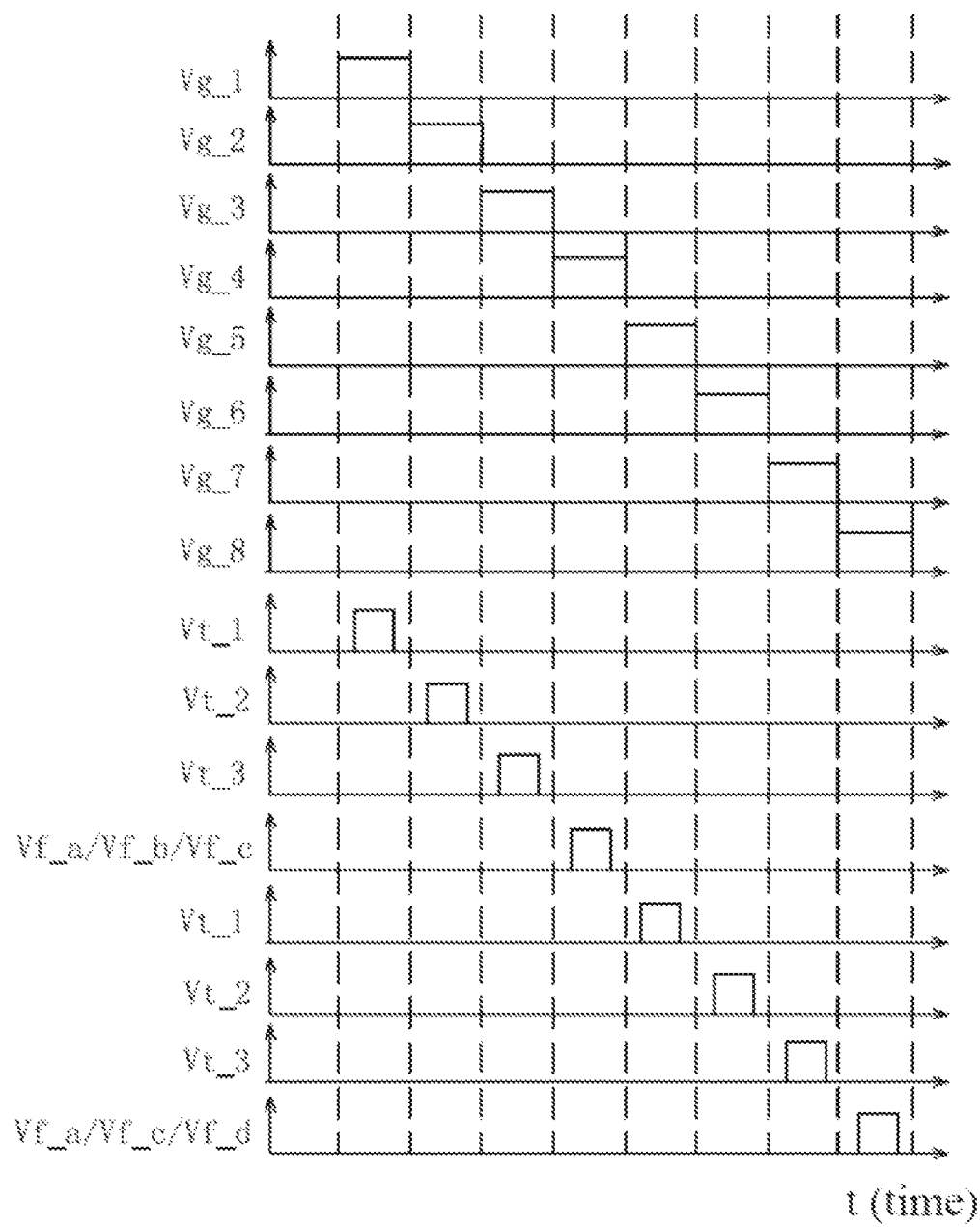
FIG. 9 is a time sequential chart of a pixel scanning pulse, touch scanning pulse and pressure scanning pulse of an enhanced 3D detection module according to a fifth embodiment of this disclosure.

See FIG. 9. The difference between a fifth embodiment of an enhanced 3D detection module (unnumbered) and the first embodiment is that the frequency of pressing value detection of the pressure-sensitive units changes, and the period of the pressure scanning pulse is longer. In future, the need of display of 3D input equipment with 4K2K resolution or higher resolution will more common, all of the scanning signal pulse widths will be narrowed, and duty cycle will be shorten. In specific structure, the distribution density of display pixel is higher than the distribution density of touch units, and the distribution density of touch units is higher than the distribution density of pressure-sensitive units. Because the enhanced 3D detection module sequentially requests the scanning frequencies of the pixel units, the touch units and the pressure-sensitive units to reduce in period, the scanning frequencies of the touch scanning pulse and the pressure scanning pulse is reduced relative to the scanning frequency of the pixel scanning pulse, which can also detect the touch points and pressing values, and minimize the energy consumption of the enhanced 3D detection module. Setting the frequency of the pixel scanning pulse is Fg, the frequency of the touch scanning pulse is Ft, and the frequency of the pressure scanning pulse is Ff, wherein Fg>Ft>Ff. Preferably, Fg=(1~20)Ft and Fg=(1~50)Ff. In this embodiment, the pulse width of the pixel scanning pulse is wider than the pulse width of the touch scanning pulse or the pressure scanning pulse.

Figure 10:
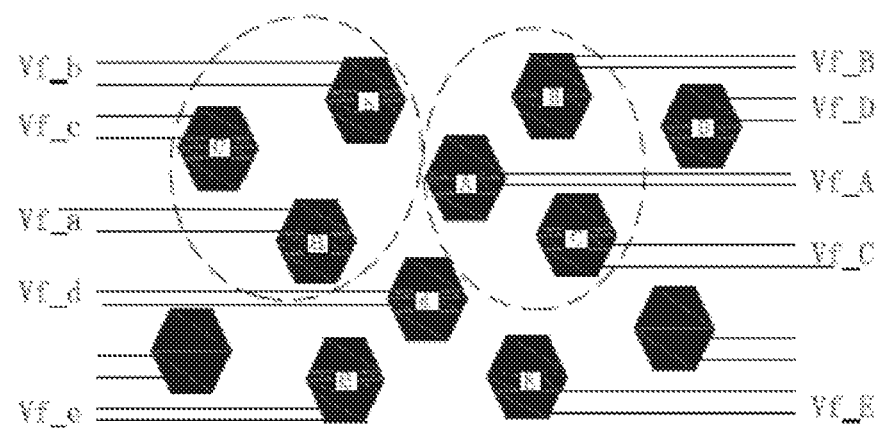
FIG. 10 is a partial structure schematic diagram of a pressure-sensitive layer of an enhanced 3D detection module according to a sixth embodiment of this disclosure.

See FIG. 10. The difference between a sixth embodiment of an enhanced 3D detection module (unnumbered) and the first embodiment is that for enhancing the pressing value detection accuracy, this embodiment uses selection of at least two adjacent pressure-sensitive unit sets at the same time in pressing value detection to detect pressing value, each pressure-sensitive unit set includes at least one pressure-sensitive unit. Preferably, the two pressure-sensitive unit sets are adjacent and symmetrical to each other in any angles. For example, the enhanced 3D detection module selects the pressure-sensitive unit 'a', the pressure-sensitive unit 'b' and the pressure-sensitive unit 'c' as a first pressure-sensitive unit set to detect the pressing value, and in the meantime, the enhanced 3D detection module selects a pressure-sensitive unit 'A', a pressure-sensitive unit 'B' and a pressure-sensitive unit 'C' at the right side of the first pressure-sensitive unit set as a second pressure-sensitive unit set to reinforce the detection signal of the first pressure-sensitive unit set. Accordingly, it is equivalent to superimpose pressing values of 6 sensing units in one pressing value detection, which improves the effect of detecting signal.

Figure 11:
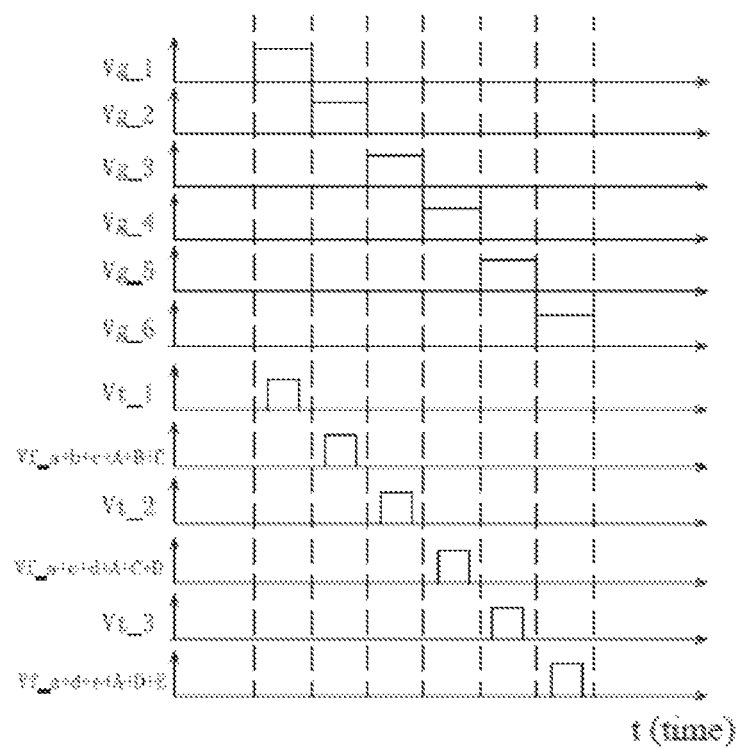
FIG. 11 is a time sequential chart of a pixel scanning pulse, touch scanning pulse and pressure scanning pulse of the enhanced 3D detection module according to the sixth embodiment of this disclosure.

In an enforced embodiment depicted in FIG. 10 (see also FIG. 7), a driver directly or indirectly outputs pressure scanning pulses Vf_a/Vf_b/Vf_c/Vf_A/Vf_B/Vf_C, which simultaneously scan the first pressure-sensitive unit set and the second set of sensing units. The pressure scanning pulse and the touch scanning pulse are generated at different time periods. In a modification of the embodiment, the pressure-sensitive unit 'a'-'c' depicted in FIG. 10 can be connected in series, and pressure-sensitive unit 'A'-'C' can be connected in series (not shown in the figures). Or, the pressure-sensitive unit 'a'-'c' and pressure-sensitive unit 'A'-'C' depicted in FIG. 10 can be connected to each other in series (not shown in the figures). Corresponding scanning pulse and pressure scanning pulse Vf_a+b+c+A+B+C are shown in FIG. 11. The pulse widths of the pressure scanning pulse and the touch scanning pulse are narrower than the pulse width of the pixel unit, so the potential switching points of each can be staggered and the interference between signals is reduced.

Figure 12:
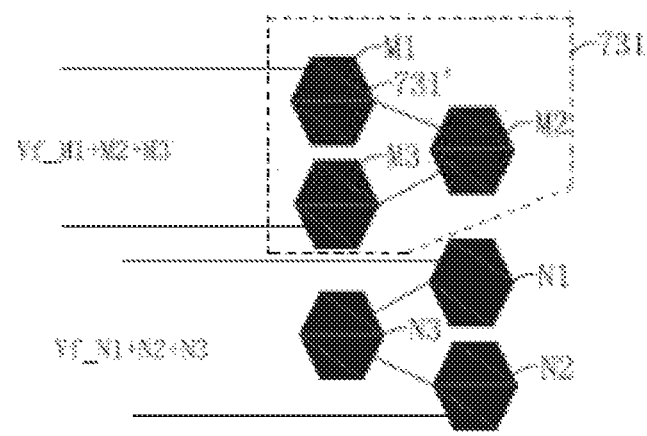
FIG. 12 is a partial structure schematic diagram of a pressure-sensitive layer of an enhanced 3D detection module according to a seventh embodiment of this disclosure.

See FIG. 12. The difference between a seventh embodiment of an enhanced 3D detection module (unnumbered) and the first embodiment is that the at least two pressure-sensitive units 731' are connected in series to form a pressure-sensitive unit set 731. In this embodiment, only taking one pressure-sensitive unit set 731 including three pressure-sensitive units 731' as an example. Because every pressure-sensitive unit set 731 includes a plurality of pressure-sensitive units 731', it is equivalent to obtain pressing values received by three pressure-sensitive units 731' in pressure detection process of the pressure-sensitive unit set 731.

Figure 13:
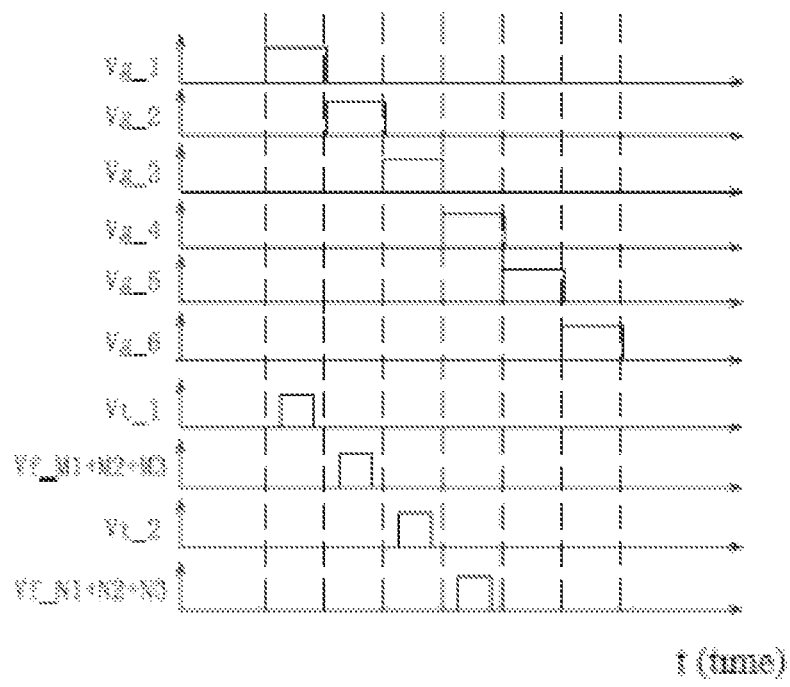
FIG. 13 is a time sequential chart of a pixel scanning pulse, touch scanning pulse and pressure scanning pulse of the enhanced 3D detection module according to the seventh embodiment of this disclosure.

See FIG. 13. The pressure scanning pulse of the pressure-sensitive unit set 731 and the touch scanning pulse of touch electrode are generated at different time periods, and both pulse widths are narrower than the pulse width of the pixel scanning pulse. Also, both potential switching points and the potential switching points of the pixel scanning pulse are staggered.

Figure 14:
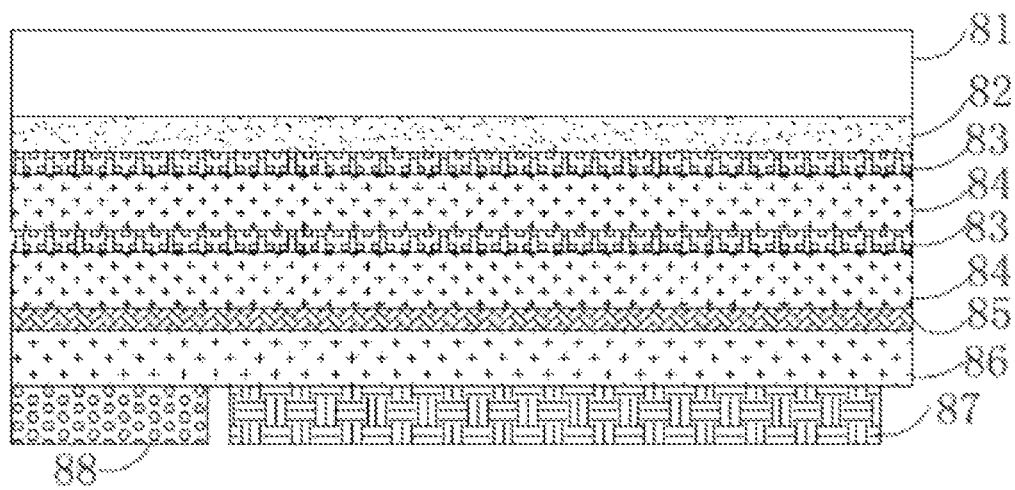
FIG. 14 is a layer structure schematic diagram of an enhanced 3D detection module according to an eighth embodiment of this disclosure.
Figure 15:
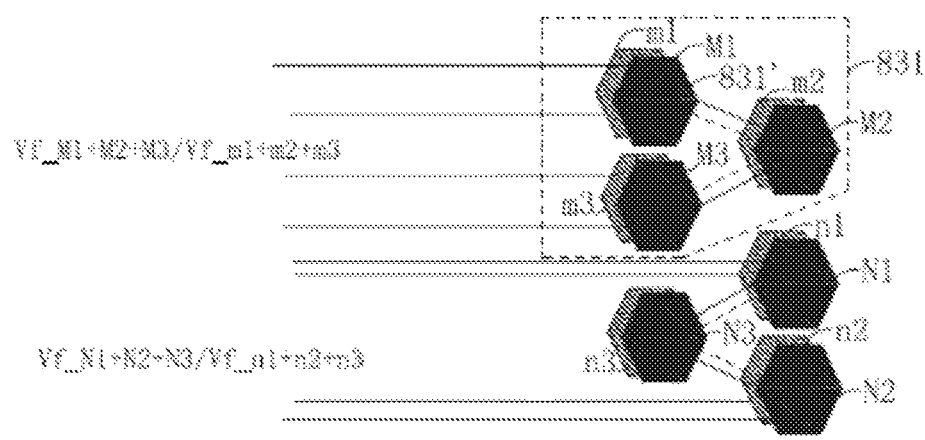
FIG. 15 is a partial structure schematic diagram of a superimposed effect of a first pressure-sensitive layer and a second pressure-sensitive layer of the enhanced 3D detection module according to the eighth embodiment of this disclosure.

See FIG. 14. The difference between an eighth embodiment of an enhanced 3D detection module 80 and the first embodiment is that the enhanced 3D detection module 80 further includes a second pressure-sensitive layer 83'. That is, the enhanced 3D detection module 80 includes (from top to bottom of FIG. 14) a top substrate 81, an adhesive layer 82, a first pressure-sensitive layer 83, a first substrate layer 84, a second pressure-sensitive layer 83', a third substrate layer 84', a touch sensitive layer 85, a second substrate layer 86, a display module 87 and a signal processing circuit 88. The first pressure-sensitive layer 83, the second pressure-sensitive layer 83', the touch sensitive layer 85 and the display module 87 are connected to the signal processing circuit 88 via a conductive line (not shown in the figure). For the first substrate layer 84 and the third substrate layer 84', flexible substrate is preferable. From the view perpendicular to the top substrate 81, the superimposition of the first pressure-sensitive layer 83 and the second pressure-sensitive layer 83' is shown in FIG. 15. The first pressure-sensitive layer 83 and the second pressure-sensitive layer 83' respectively have a plurality of distributed pressure-sensitive unit sets 831 disposed thereon, wherein every pressure-sensitive unit set 831 is connected to at least one pressure-sensitive unit 831' in series. The pressure-sensitive units 831' on the first pressure-sensitive layer 83 and the second pressure-sensitive layer 83' are disposed correspondingly to each other in vertically projective positions, in a staggered manner or complementarily to each other.

In one pressing value detection process, the pressures received by the pressure-sensitive unit 831 on the first pressure-sensitive layer 83 and the second pressure-sensitive layer 83' are superimposed. For example, the pressure-sensitive unit set 831 on the first pressure-sensitive layer 83 includes a pressure-sensitive unit M1, a pressure-sensitive unit M2 and a pressure-sensitive unit M3 connected in series, and the pressure-sensitive unit set 831 on the second pressure-sensitive layer 83' includes a pressure-sensitive unit m1, a pressure-sensitive unit m2, and a pressure-sensitive unit m3 connected in series. The pressure-sensitive units 831' on the first pressure-sensitive layer 83 and the second pressure-sensitive layer 83' are disposed correspondingly to each other, in translational displacement, in a staggered manner or complementarily to each other. Taking the pressure-sensitive unit M1 and the pressure-sensitive unit m1 which are corresponding to each other in vertically projective positions as an example, the vertical projection area of the pressure-sensitive unit m1 on the pressure-sensitive unit M1 is 5%-100% (preferably, 50%-80%) of the area of one single pressure-sensitive unit 831'. One pressing value detection corresponds to a superimposition of the effects of pressing value of the first pressure-sensitive layer 83 and the second pressure-sensitive layer 83'. That is, what being detected at the same time in one pressing value detection is the sum of the pressing values received by the pressure-sensitive unit M1, the pressure-sensitive unit M2, the pressure-sensitive unit M3, the pressure-sensitive unit m1, the pressure-sensitive unit m2 and the pressure-sensitive unit m3, so the detection performance of the enhanced 3D detection module 80 is improved.

Figure 16:
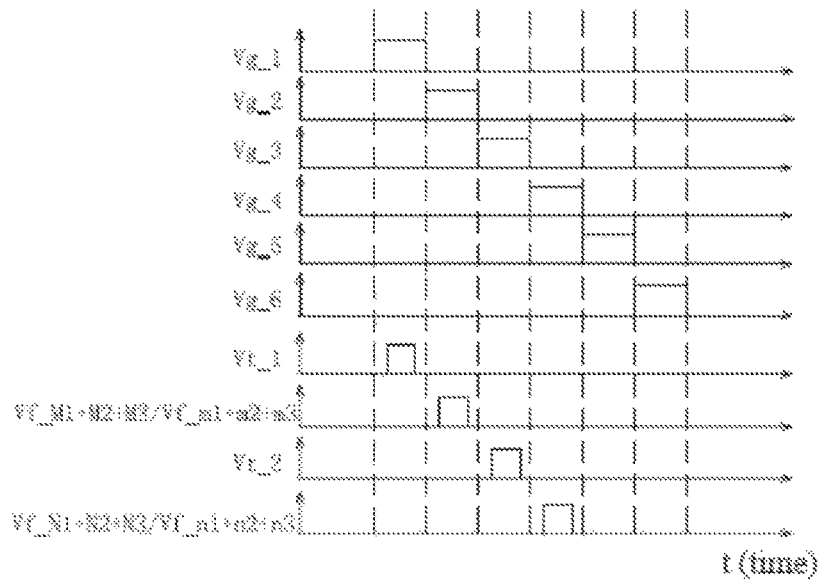
FIG. 16 is a time sequential chart of a pixel scanning pulse, touch scanning pulse and pressure scanning pulse of the enhanced 3D detection module according to the eighth embodiment of this disclosure.

See FIG. 16. Vf_M1+M2+M3 and Vf_m1+m2+m3 provide simultaneous pressure scanning pulses to the pressure-sensitive unit M1, the pressure-sensitive unit M2, the pressure-sensitive unit M3, the pressure-sensitive unit m1, the pressure-sensitive unit m2 and the pressure-sensitive unit m3 (see FIG. 15, the pressure-sensitive unit M1-M3 connected in series and the pressure-sensitive unit m1-m3 connected in series) to ensure the accuracy of the pressing value detection. The pressure scanning pulse of the pressure-sensitive unit 831 and the touch scanning pulse of touch electrode are generated at different time periods, both pulse widths are narrower than the pulse width of the pixel scanning pulse and the potential switching points of both and the potential switching points of the pixel scanning pulse are staggered in order to reduce the signal interference between them.

The pressure-sensitive layer of the enhanced 3D detection module is not limited to one or two layers, it can be a plurality layers.

Figure 17:
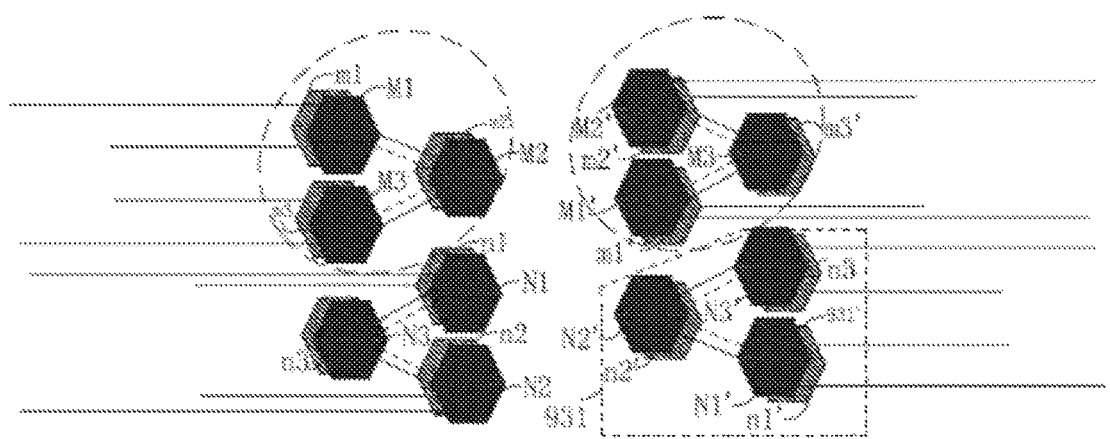
FIG. 17 is a partial structure schematic diagram of a superimposed effect of a first pressure-sensitive layer and a second pressure-sensitive layer of an enhanced 3D detection module according to a ninth embodiment of this disclosure.

See FIG. 17. The difference between a ninth embodiment of an enhanced 3D detection module (unnumbered) and the eighth embodiment is that the enhanced 3D detection module uses at least two adjacent pressure-sensitive unit sets 931 on the base of the first pressure-sensitive layer 83 and the second pressure-sensitive layer 83' disclosed in the eighth embodiment to detect one pressing value. It is equivalent to selecting six corresponding pressure-sensitive units 931' from the first pressure-sensitive layer and the second pressure-sensitive layer. For example, the enhanced 3D detection module selects the pressure-sensitive unit M1, pressure-sensitive unit M2 and the pressure-sensitive unit M3 on the first pressure-sensitive layer as the first pressure-sensitive unit set 931, selects the pressure-sensitive unit M1', the pressure-sensitive unit M2' and the pressure-sensitive unit M3' on the first pressure-sensitive layer as the second pressure-sensitive unit set 931, selects the pressure-sensitive unit m1, the pressure-sensitive unit m2 and the pressure-sensitive unit m3 on the second pressure-sensitive layer as the third pressure-sensitive unit set 931, and selects the pressure-sensitive unit m1', the pressure-sensitive unit m2' and the pressure-sensitive unit m3' on the second pressure-sensitive layer as the fourth pressure-sensitive unit set 931. The detecting result by these four pressure-sensitive unit sets 931 is equivalent to a superimposition of the pressing values received by twelve pressure-sensitive units, so the effect of enhanced detection signal is improved.

Figure 18:
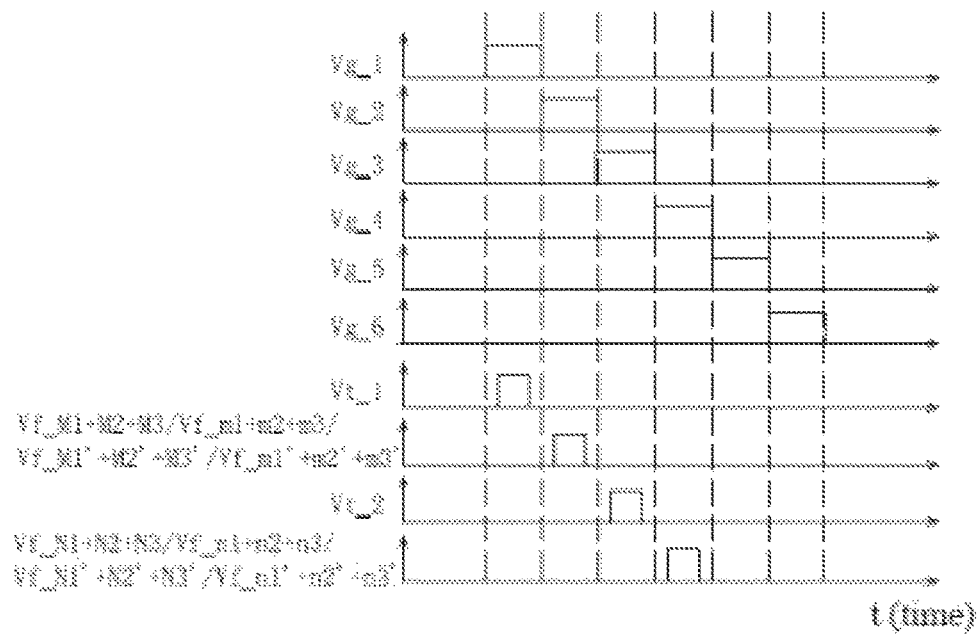
FIG. 18 is a time sequential chart of a pixel scanning pulse, touch scanning pulse and pressure scanning pulse of the enhanced 3D detection module according to the ninth embodiment of this disclosure.

See FIG. 18. Vf_M1+M2+M3, Vf_M1'+M2'+M3', Vf_m1+m2+m3 and Vf_m1'+m2'+m3' respectively drive series units, or a collective series Vf_M1+M2+M3+m1+m2+m3 and Vf_M1'+M2'+M3'+m1'+m2'+m3' can provide simultaneous pressure scanning pulse to the selected four sets or twelve pressure-sensitive units 931' on the first pressure-sensitive layer and the second pressure-sensitive layer to ensure the accuracy of pressing value detection. The pressure scanning pulse of the pressure-sensitive unit 931 and the touch scanning pulse of the touch electrode are generated at different time periods, both pulse widths are narrower than the pulse width of the pixel scanning pulse and the potential switching points of both and the potential switching points of the pixel scanning pulse are staggered in order to reduce the signal interference between them.

Figure 19:
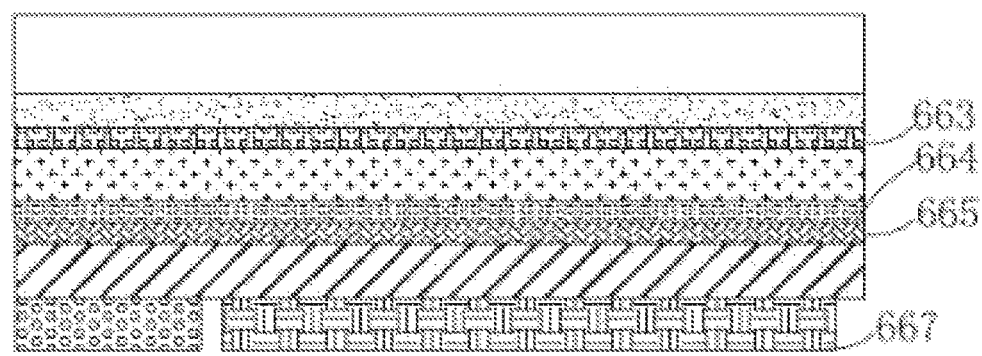
FIG. 19 is a layer structure schematic diagram of an enhanced 3D detection module according to a tenth embodiment of this disclosure.

See FIG. 19. The difference between a tenth embodiment of an enhanced 3D detection module 66 and the first embodiment is that in this embodiment, the 3D detection module 66 has a shield layer 664 between a pressure-sensitive layer 663 and a touch sensitive layer 665. The shield layer 664 is used to reduce the signal interference between the pressure-sensitive layer 663 and the touch sensitive layer 665. Manufacturers can also add a shield layer (not shown in the figures) between the touch sensitive layer 665 and a display module 667 to reduce the signal interference between them. In a preferable embodiment, the shield layer 664 is a metal layer, and can selectively use hollow design based on the design of pixel units to improve the overall light transmittance of the enhanced 3D detection module 66.

Figure 20:
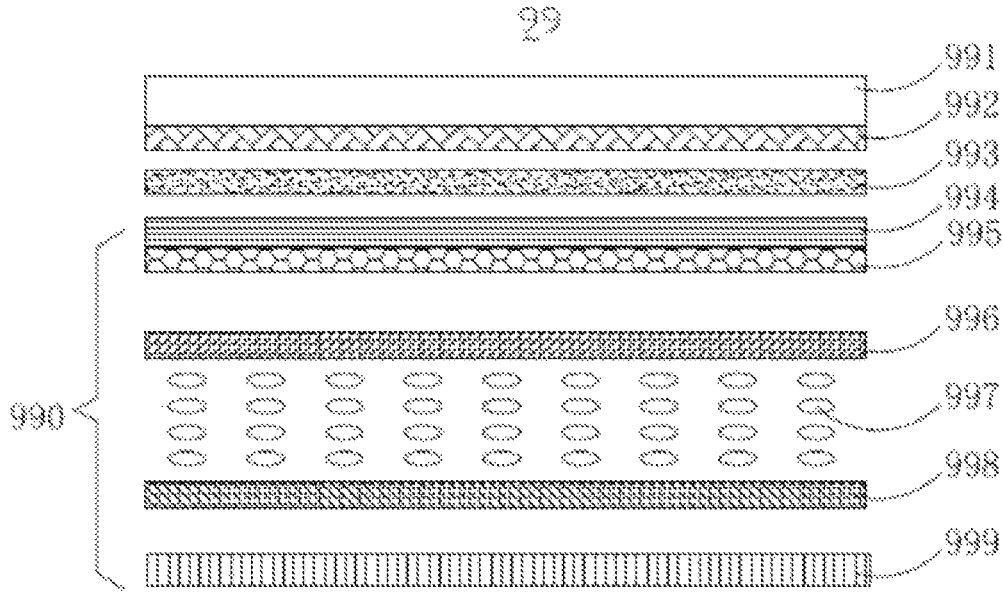
FIG. 20 is a layer structure explosion schematic of an enhanced 3D detection module according to an eleventh embodiment of this disclosure.

See FIG. 20. An eleventh embodiment of an enhanced 3D detection module 99 includes (from top to bottom of FIG. 20) a top substrate 991, an adhesive layer 992, a pressure-sensitive layer 993 and a display module 990. The display module 990 includes (from top to bottom of FIG. 20) a top polaroid 994, a touch sensitive layer 995, a top substrate 996, a liquid crystal layer 997, a bottom substrate 998 and a bottom polaroid 999. The top substrate 996 and the bottom substrate 998 sandwich the liquid crystal layer 997. The position of the touch sensitive layer 995 is not limited and can be disposed on the bottom surface of the top polaroid 994, the top surface/bottom surface of the top substrate 996, the top surface/bottom surface of the bottom substrate 998, or the bottom surface of the bottom polaroid 999. The touch sensitive layer 995 includes a plurality of first directional touch electrodes (not shown in the figures) and a plurality of second directional touch electrodes (not shown in the figures). The plurality of the first directional touch electrodes and the plurality of the second directional touch electrodes define arrayed touch units. The plurality of the first directional touch electrodes and the plurality of the second directional touch electrodes can be respectively disposed on the bottom surface of the top polaroid 994, the top surface/bottom surface of the top substrate 996, the top surface/bottom surface of the bottom substrate 998, or any two surfaces of the bottom surface of the bottom polaroid 999. The pressure-sensitive layer 993 and the top substrate 991 bond to each other via the adhesive layer 992 and then bond to the display module 990. Accordingly, the pressure-sensitive layer 993 can be easily disposed on a touch display panel (e.g., in-cell LCD, on-cell LCD or on-cell AMOLED) with embedded structure, making the enhanced 3D detection module 99 has the function of detecting touch points pressing value while having the feature of touch display. The enhanced 3D detection module 99 can also include a plurality of pressure-sensitive layer 993.

Figure 21:
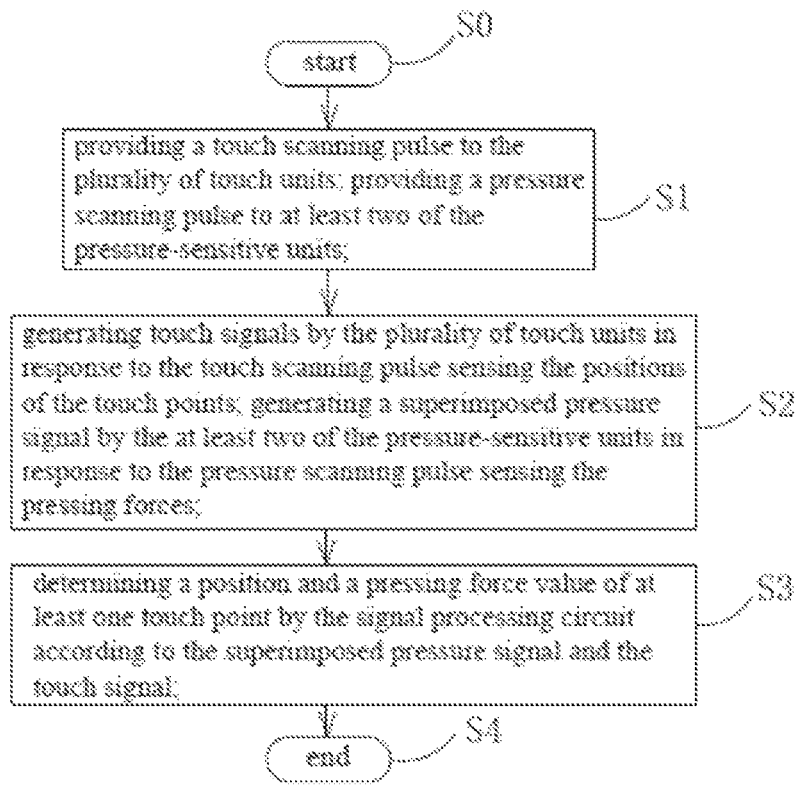
FIG. 21 is a flow chart of a method for an enhanced 3D detection module according to a twelfth embodiment of this disclosure.

See FIG. 21. A twelfth embodiment provides a detection method for an enhanced 3D detection module. The enhanced 3D detection module can be any enhanced 3D detection module mentioned in the first embodiment to the eleventh embodiment (see the names and the numbers of the elements of the first embodiment as the reference for this embodiment). The enhanced 3D detection module can include a plurality of touch units at the position of a sensing touch point and a plurality of pressure-sensitive units for sensing pressing value. The detection method for an enhanced 3D detection module includes:

step S0: start;

step S1: providing a touch scanning pulse to the plurality of the touch units, and providing a pressure scanning pulse to at least two pressure-sensitive units 131;

step S2: generating touch signals by the plurality of touch units in response to the touch scanning pulse sensing the positions of the touch points, and generating a superimposed pressure signal by the at least two pressure-sensitive units 131 in response to the pressure scanning pulse sensing the pressing forces;

step S3: determining a position and a pressing force value of at least one touch point by the signal processing circuit according to the superimposed pressure signal and the touch signals;

step S4: end.

In step S2, the at least two pressure-sensitive units 131 can be a plurality of independent and adjacent pressure-sensitive units 131 selected from the pressure-sensitive layer 15, a plurality of pressure-sensitive units disposed on a same plane that are connected in series, vertically/horizontally adjacent pressure-sensitive units 131, or a plurality of pressure-sensitive units 131 on the pressure-sensitive layer 15 (e.g., at least two pressure-sensitive units are respectively disposed on a first pressure-sensitive layer and a second pressure-sensitive layer in a manner of being corresponding to each other in vertical projection direction, translational displacement, staggered, or being complementary to each other).

In all the embodiments of present disclosure, the touch sensitive layer 15 is used to confirm multi-positions pressing. The pressure-sensitive layer 13 mentioned in all the embodiments can selectively detect a plurality of pressure-sensitive units (e.g., detect a superimposed variance of one or more pressure-sensitive units at a time), and cooperate with the touch sensitive layer 15 to perform accurate locating for a plurality of positions simultaneously. The pixel scanning pulse, the pressure scanning pulse and the touch scanning pulse are all generated at the same time period. The pressure scanning pulse and the touch scanning pulse can be generated at different time periods, or the same time period but the potential switching points of them are staggered. In step S2, the pressure scanning pulse of the at least two pressure-sensitive units and the touch scanning pulse are generated at different time periods, the at least two pressure-sensitive units receive the same pressure scanning pulse or the pressure scanning pulses that are independent to each other, wherein the pressure scanning pulses that are independent to each other are generated at the same time period or different time periods.

Compared to prior art, the detection method for the enhanced 3D detection module disclosed in this embodiment detects the plurality of pressure-sensitive units 131 at a time to process the superimposition of pressing values, so the pressure detection effect is improved. When the pressure scanning pulse and the touch scanning pulse are generated at different time periods or the same time period, the potential switching points are staggered, so the signal interference between them are reduced.

The present disclosure only discloses the preferred embodiments, and is not limited in this regard. In view of the foregoing, it is intended that the present invention covers modifications and variations of this invention provided they fall within the scope of the following claims.

What is claimed is:

1. A detection method for enhanced 3D detection module, comprising steps of:
   providing a pressure scanning pulse to an independent pressure-sensitive unit and at least one adjacent pressure-sensitive unit at a same time;
   respectively generating a first resistance variation and a second resistance variation from the independent pressure-sensitive unit and the at least one adjacent pressure-sensitive unit when the independent pressure-sensitive unit and the at least one adjacent pressure-sensitive unit are deformed by a pressing force from a touched point;
   generating a first pressure signal by the independent pressure-sensitive unit and a second pressure signal by the at least one adjacent pressure-sensitive unit in response to the pressure scanning pulse at the same time, wherein the first pressure signal includes the first resistance variation and the second pressure signal includes the second resistance variation;
   superimposing the first resistance variation and the second resistance variation to generate a superimposed pressure signal; and
   determining a pressing force value of the pressing force from the touched point according to the superimposed pressure signal.

2. The detection method for enhanced 3D detection module of claim 1, further comprising steps of:
   providing a touch scanning pulse to a touch unit;
   generating a touch signal by the touch unit in response to the touch scanning pulse when sensing the touched point; and
   determining a position of the touched point according to the touch signal.

3. The detection method for enhanced 3D detection module of claim 2, wherein the pressure scanning pulse and the touch scanning pulse are generated at different time periods.

4. The detection method for enhanced 3D detection module of claim 2, wherein the enhanced 3D detection module comprises a display module having a pixel unit and the detection method further comprises a step of providing a pixel scanning pulse to the pixel unit.

5. The detection method for enhanced 3D detection module of claim 4, wherein the enhanced 3D detection module comprises a driver, the driver provides the pixel scanning pulse, the pressure scanning pulse and the touch scanning pulse directly or indirectly.

6. The detection method for enhanced 3D detection module of claim 4, wherein the frequency of the pixel scanning pulse is Fg, the frequency of the touch scanning pulse is Ft, and the frequency of the pressure scanning pulse is Ff, wherein Fg>Ft>Ff, Fg=(1~20)Ft, Fg=(1~50)Ff.

7. The detection method for enhanced 3D detection module of claim 4, wherein:
   the pixel scanning pulse has at least two potential switching points and the touch scanning pulse has at least two potential switching points,
   the pixel scanning pulse and the touch scanning pulse are generated at a same time period, and
   the at least two potential switching points of the pixel scanning pulse and the at least two potential switching points of the touch scanning pulse are staggered.

8. The detection method for enhanced 3D detection module of claim 4, wherein:
   the pixel scanning pulse has at least two potential switching points and the pressure scanning pulse has at least two potential switching points,
   the pixel scanning pulse and the pressure scanning pulse are generated at a same time period, and
   the at least two potential switching points of the pixel scanning pulse and the at least two potential switching points of the pressure scanning pulse are staggered.

9. The detection method for enhanced 3D detection module of claim 2, wherein:
   the pressure scanning pulse has at least two potential switching points and the touch scanning pulse has at least two potential switching points,
   the pressure scanning pulse and the touch scanning pulse are generated at a same time period, and
   the at least two potential switching points of the pressure scanning pulse and the at least two potential switching points of the touch scanning pulse are staggered.

10. The detection method for enhanced 3D detection module of claim 1, wherein in the step 2, the at least two of the pressure-sensitive units are disposed on a same plane, and the at least two of the pressure-sensitive units are connected in series.

11. The detection method for enhanced 3D detection module of claim 1, wherein in the step 2, the at least two of the pressure-sensitive units are disposed on a first pressure-sensitive layer and a second pressure-sensitive layer respectively, and are disposed oppositely to each other, in translational displacement, in a staggered manner, or in a complementary manner in vertical projection direction.

12. The detection method for enhanced 3D detection module of claim 1, wherein in the step 2, the pressure scanning pulse of the at least two of the pressure-sensitive units and the touch scanning pulse are generated at an identical time period, and potential switching points of the pressure scanning pulse and the touch scanning pulse are staggered.

13. The detection method for enhanced 3D detection module of claim 1, wherein in the step 2, the at least two of the pressure-sensitive units are respectively chosen from vertically or horizontally adjacent two sets of pressure-sensitive units, each of the sets of pressure-sensitive units comprises at least one pressure-sensitive unit, the pressure scanning pulse of the at least two of the pressure-sensitive units and the touch scanning pulse are generated at different time periods, and potential switching points of the pressure scanning pulse and the touch scanning pulse are staggered.

14. The detection method for enhanced 3D detection module of claim 1, wherein in the step 2, the at least two of the pressure-sensitive units are a plurality of pressure-sensitive units, the plurality of pressure-sensitive units are respectively disposed on a first pressure-sensitive layer and a second pressure-sensitive layer, the plurality of pressure-sensitive units disposed on the first pressure-sensitive layer and the second pressure-sensitive layer respectively are divided into groups and the pressure-sensitive units of each group are connected in series, each group of pressure-sensitive units comprises at least two pressure-sensitive units.

15. The detection method for enhanced 3D detection module of claim 14, wherein in the step 2, at least one pressure-sensitive unit of the at least two of the pressure-sensitive units is disposed on the first pressure-sensitive layer, and at least one another pressure-sensitive unit is disposed on the second pressure-sensitive layer, the pressure scanning pulse of the at least one pressure-sensitive unit on the first pressure-sensitive layer and the pressure scanning pulse of the at least one another pressure-sensitive unit on the second pressure-sensitive layer are generated at the same time period.

16. The detection method for enhanced 3D detection module of claim 1, wherein the independent pressure-sensitive unit and the at least one adjacent pressure-sensitive unit are disposed on a same plane.

17. The detection method for enhanced 3D detection module of claim 1, wherein the position of the at least one adjacent pressure-sensitive unit is near the position of the independent pressure-sensitive unit.

18. The detection method for enhanced 3D detection module of claim 1, wherein each of the independent pressure-sensitive unit and the at least one adjacent pressure-sensitive unit includes a pressure driving line and a pressure signal reception line, and wherein the pressure driving line is used for receiving the pressure scanning pulse and the pressure signal reception line is used for sending the first pressure signal or the second pressure signal.

19. The detection method for enhanced 3D detection module of claim 1, wherein a different value of the superimposed pressure signal corresponds to a different value of the pressing force value.

20. The detection method for enhanced 3D detection module of claim 1, wherein the independent pressure-sensitive unit and the at least one adjacent pressure-sensitive unit have a same pulse width and a same amplitude intensity.

* * * * *